US010844972B2

(12) United States Patent
Nakagawa

(10) Patent No.: US 10,844,972 B2
(45) Date of Patent: Nov. 24, 2020

(54) SOLENOID VALVE AND MANUFACTURING METHOD THEREFOR

(71) Applicant: Mitsubishi Electric Corporation, Tokyo (JP)

(72) Inventor: Satoshi Nakagawa, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 124 days.

(21) Appl. No.: 16/084,020

(22) PCT Filed: Mar. 17, 2016

(86) PCT No.: PCT/JP2016/058505
§ 371 (c)(1),
(2) Date: Sep. 11, 2018

(87) PCT Pub. No.: WO2017/158788
PCT Pub. Date: Sep. 21, 2017

(65) Prior Publication Data
US 2019/0390790 A1 Dec. 26, 2019

(51) Int. Cl.
F16K 31/06 (2006.01)
F02M 25/08 (2006.01)

(52) U.S. Cl.
CPC ............ F16K 31/06 (2013.01); F02M 25/08 (2013.01); F02M 2025/0845 (2013.01); F16K 31/0655 (2013.01)

(58) Field of Classification Search
CPC ..... F16K 31/06; F16K 31/0655; F02M 25/08; F02M 2025/0845
See application file for complete search history.

(56) References Cited

U.S. PATENT DOCUMENTS

2002/0000529 A1* 1/2002 Ishigaki ............ F02M 25/0836
251/129.15
2013/0060084 A1* 3/2013 Fouts ................. A61B 17/3421
600/106

FOREIGN PATENT DOCUMENTS

| DE | 202013001743 U1 | 5/2014 |
| JP | 2004-11741 A | 1/2004 |
| JP | 2015-218810 A | 12/2015 |

* cited by examiner

Primary Examiner — Umashankar Venkatesan
(74) Attorney, Agent, or Firm — Birch, Stewart, Kolasch & Birch, LLP

(57) ABSTRACT

By providing a mountain-shaped mountain portion (5a) protruded from a surface of a plunger (5) facing a valve seat to the inside of a rubber member (8), a dimensional change amount of a valve seat abutting portion (8a) in an opening and closing direction decreases, and thus it is possible to suppress change in characteristic. Also, it is possible to secure a rubber deformation amount sufficient for absorbing impact when the valve seat abutting portion (8a) collides with the valve seat, thereby suppressing an operation sound.

7 Claims, 3 Drawing Sheets

FIG. 3A  FIG. 3B  FIG. 3C
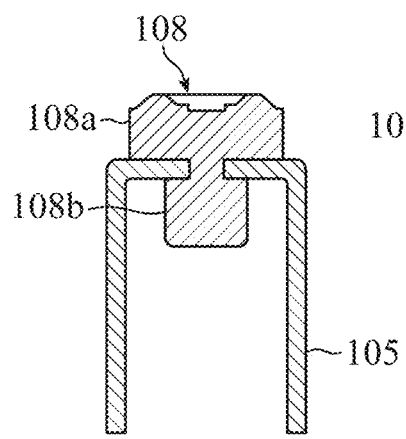
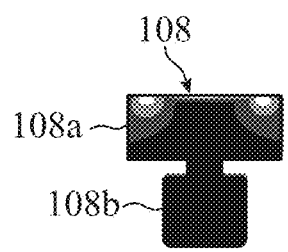
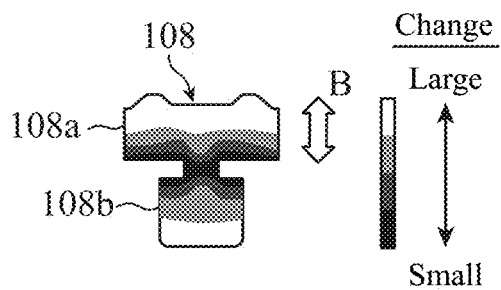
FIG. 4
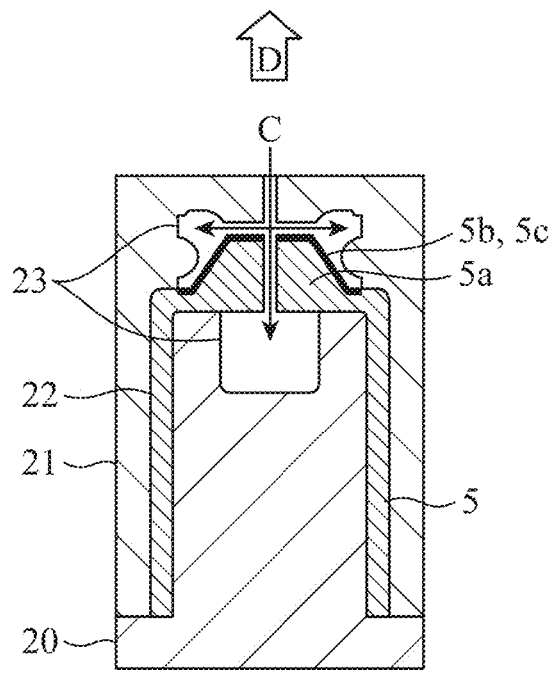

SOLENOID VALVE AND MANUFACTURING METHOD THEREFOR

TECHNICAL FIELD

The present invention relates to a solenoid valve for opening and closing a fluid passage and a manufacturing method therefor.

BACKGROUND ART

In a solenoid valve, there is a case in which an impact sound is generated when a plunger, which is a movable iron core, collides with peripheral parts and the impact sound is heard by a user as an operation sound. Therefore, as a method of absorbing the impact, it is proposed to attach a thick rubber elastic body to a tip end of the plunger (refer to, for example, Patent Literature 1).

CITATION LIST

Patent Literatures

Patent Literature 1: JP 2004-11741 A

SUMMARY OF INVENTION

Technical Problem

When a conventional solenoid valve is used for a purge valve of an evaporation gas treatment system of a vehicle, for example, dimensional change due to change in usage environment of the vehicle, especially change in temperature, and dimensional change due to swelling with gasoline and the like occur in the rubber elastic body. Thus, flow rate control performance of the solenoid valve is problematically deteriorated.

Also, when the elastic body is made thicker to suppress the operation sound, this is likely to be affected by the usage environment. Thus, there also is a problem that the thickness of the elastic body is limited for practical use, which makes it impossible to sufficiently obtain an effect of suppressing the operation sound.

The present invention is achieved to solve the above-described problem, and an object thereof is to suppress an operation sound while suppressing change in characteristic of a solenoid valve due to an effect of a usage environment such as temperature and swelling.

Solution to Problem

A solenoid valve according to the present invention is provided with a solenoid unit for generating electromagnetic attracting force, a spring for generating biasing force in a direction opposite to a direction of the electromagnetic attracting force, a plunger for reciprocating in directions of opening and closing a fluid passage by the electromagnetic attracting force and the biasing force, a valve seat provided in the fluid passage, a pin for restricting movement of the plunger caused by the electromagnetic attracting force, a rubber member provided on a surface of the plunger facing the valve seat and on a surface of the plunger facing the pin and for abutting on the valve seat and the pin along with reciprocating movement of the plunger, and a mountain-shaped mountain portion protruded from the surface of the plunger facing the valve seat to an inside of the rubber member.

Advantageous Effects of Invention

According to the present invention, by providing the mountain-shaped mountain portion protruded from the surface of the plunger facing the valve seat to the inside of the rubber member, it is possible to suppress an operation sound while suppressing change in characteristic of the solenoid valve due to an effect of a usage environment.

BRIEF DESCRIPTION OF DRAWINGS

FIG. 3A is a cross-sectional view illustrating a reference example of a plunger and a rubber member, and FIGS. 3B and 3C are views illustrating a deflection amount and a dimensional change amount of the rubber member.

FIG. 4 is a cross-sectional view of a mold for illustrating a method of manufacturing the solenoid valve according to the first embodiment.

DESCRIPTION OF EMBODIMENTS

Modes for carrying out the present invention are hereinafter described with reference to the attached drawings in order to describe the present invention in more detail.

First Embodiment

Figure 1:
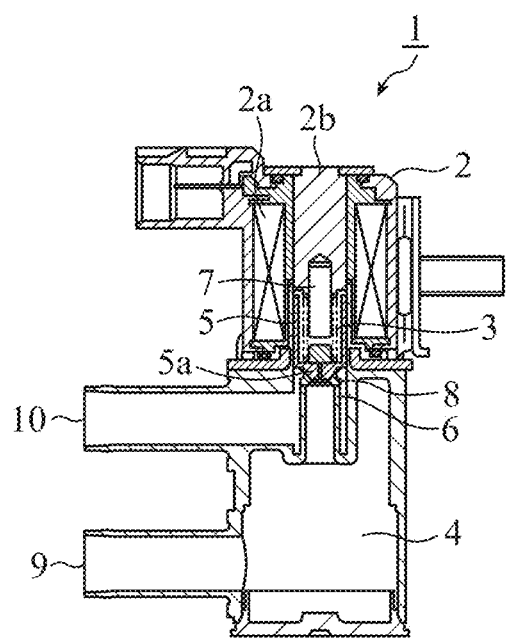
FIG. 1 is a cross-sectional view illustrating a configuration example of a solenoid valve according to a first embodiment of the present invention.

FIG. 1 is a cross-sectional view illustrating a configuration example of a solenoid valve 1 according to a first embodiment of the present invention, illustrating a closed state of the solenoid valve 1. The solenoid valve 1 is provided with a solenoid unit 2 which generates electromagnetic attracting force, a spring 3 which generates biasing force in a direction opposite to that of the electromagnetic attracting force, a plunger 5 which reciprocates in directions of opening and closing a fluid passage 4 by the electromagnetic attracting force and the biasing force, a valve seat 6 provided in the fluid passage 4, a pin 7 which restricts movement of the plunger 5 caused by the electromagnetic attracting force, a rubber member 8 which abuts on the valve seat 6 and the pin 7 along with reciprocating movement of the plunger 5, and a mountain-shaped mountain portion 5a protruded from a surface of the plunger 5 facing the valve seat 6 to the inside of the rubber member 8.

In the first embodiment, an example in which the solenoid valve 1 is used as a purge valve of an evaporation gas treatment system is described.

Herein, the evaporation gas treatment system is briefly described.

The evaporation gas treatment system is mounted on a vehicle to prevent air pollution. This evaporation gas treatment system includes a gasoline tank, a canister, the purge valve, and an intake manifold, and these parts are connected by piping.

Evaporation gas generated in the gasoline tank is separated into gasoline and air by the canister, and only the air is released to the atmosphere. As a result, outflow of the evaporation gas to the atmosphere is prevented. The gasoline adsorbed to activated carbon in the canister is sucked by a negative pressure generated in the intake manifold and introduced into an engine to be burned. At that time, the purge valve, that is, the solenoid valve 1 is used to control a flow rate from the canister to the intake manifold.

In the example in FIG. 1, a port 9 of the solenoid valve 1 is connected to canister side piping, and a port 10 thereof is connected to intake manifold side piping. The solenoid unit 2 is formed of a coil 2a, a core 2b and the like. In the solenoid unit 2, the electromagnetic attracting force is generated in the core 2b by energization of the coil 2a to attract the plunger 5, thereby separating the rubber member 8 from the valve seat 6 to open the valve. When the valve is opened, the gasoline in the canister flows through the port 9, the fluid passage 4, the valve seat 6, and the port 10 to be sucked into the intake manifold, and is burned in the engine. When the coil 2a is not energized, the spring 3 pushes the plunger 5 toward the valve seat 6 by the biasing force thereof, thereby allowing the rubber member 8 to abut on the valve seat 6 to close the valve.

A conventional solenoid valve used as the purge valve controls the flow rate by changing a rate of opening time and closing time. By shortening one cycle time of the opening and closing time at that time, highly accurate flow rate control is achieved. On the other hand, when opening and closing operation is repeated in a short time, an impact sound occurs by collision when a rubber member abuts on a valve seat and a pin. The impact sound is heard by a passenger of the vehicle as an operation sound.

In addition, since the solenoid valve used as the purge valve is often attached to an engine compartment, ambient temperature around the solenoid valve is high. For this reason, dimensional change of the rubber member occurs due to temperature change. Also, since the gasoline is contained in control fluid, the dimensional change occurs due to swelling of the rubber member with the gasoline. When a dimension of the rubber member in an opening and closing direction changes, a flow rate characteristic of the purge valve changes.

Figure 2A:
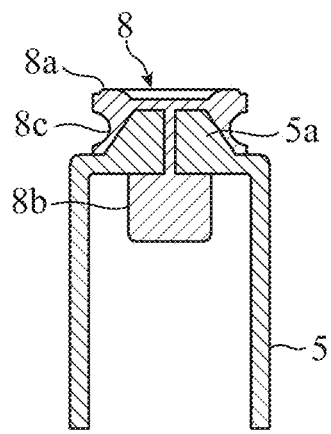
FIG. 2A is a cross-sectional view illustrating a configuration example of a plunger and a rubber member in the solenoid valve according to the first embodiment.

Therefore, in the first embodiment, the plunger 5 and the rubber member 8 are configured as in FIGS. 1 and 2A in order to achieve suppression of the operation sound and suppression of the change in characteristic in the solenoid valve 1.

Figure 2B:
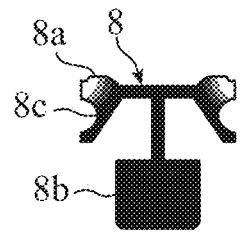
FIGS. 2B and 2C are views illustrating a deflection amount and a dimensional change amount of the rubber member.
Figure 2C:
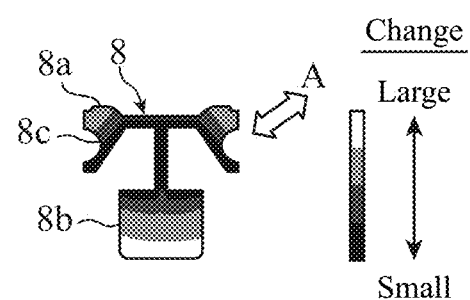

FIG. 2A is a cross-sectional view illustrating a configuration example of the plunger 5 and the rubber member 8 in the solenoid valve 1 according to the first embodiment. FIGS. 2B and 2C are views illustrating a deflection amount and a dimensional change amount of the rubber member 8 having the configuration illustrated in FIG. 2A. In FIGS. 2B and 2C, the larger the deflection amount and the dimensional change amount, the more it is illustrated in white, and the smaller the amounts, the more it is illustrated in black.

As illustrated in FIG. 2A, the plunger 5 is a cylindrical metal magnetic body, and on an end face of the cylindrical body near the valve seat 6, the mountain-shaped mountain portion 5a projecting toward the valve seat 6 is provided. The rubber member 8 includes a valve seat abutting portion 8a provided on a surface of the plunger 5 facing the valve seat 6 and a pin abutting portion 8b provided on a surface of the plunger 5 facing the pin 7. The mountain portion 5a of the plunger 5 is arranged inside the valve seat abutting portion 8a of the rubber member 8. The valve seat abutting portion 8a abuts on the valve seat 6 to close the valve when the plunger 5 moves in a valve closing direction by the biasing force of the spring 3. The pin abutting portion 8b on the opposite side abuts on the pin 7 to restrict the movement of the plunger 5 when the plunger 5 moves in a valve opening direction by the electromagnetic attracting force of the solenoid unit 2. Furthermore, the rubber member 8 includes a concave portion 8c on a side surface of the valve seat abutting portion 8a, that is, a surface covering an inclined surface of the mountain portion 5a. In the example in FIGS. 2A to 2C, the concave portion 8c having a semicircular cross section is formed over an entire circumference of the side surface of the valve seat abutting portion 8a.

FIG. 3A is a cross-sectional view illustrating a configuration example of a plunger 105 and a rubber member 108 as a reference example for assisting the understanding of the solenoid valve 1 according to the first embodiment. FIGS. 3B and 3C are views illustrating a deflection amount and a dimensional change amount of the rubber member 108 having the configuration illustrated in FIG. 3A. As in FIGS. 2B and 2C, also in FIGS. 3B and 3C, the larger the deflection amount and the dimensional change amount, the more it is illustrated in white, and the smaller the amounts, the more it is illustrated in black.

As illustrated in FIG. 3A, the plunger 105 of the reference example is a cylindrical metal magnetic body, and the rubber member 108 is provided on an end of the cylindrical body near the valve seat 6. The rubber member 108 includes a valve seat abutting portion 108a and a pin abutting portion 108b. The valve seat abutting portion 108a of the reference example is entirely made of rubber (including the inside thereof) and there is no concave portion 8c on a side surface thereof.

As the deflection amount of the rubber members 8 and 108 increases, the impact due to collision with the valve seat 6 and the pin 7 is more likely to be absorbed, and thus an effect of suppressing the operation sound is increased. When FIG. 2B and FIG. 3B are compared with each other, the deflection amount of the valve seat abutting portion 108a of the reference example and the deflection amount of the valve seat abutting portion 8a of the first embodiment are substantially the same. Therefore, the valve seat abutting portions 8a and 108a can secure the deflection amount of the rubber member 8 sufficient for absorbing the impact when abutting on the valve seat 6, thereby suppressing the operation sound.

In a case in which a dimensional change direction of the rubber members 8 and 108 is the same as the opening and closing direction in which the plunger 5 reciprocates, that is, the same as an up-and-down direction of FIGS. 2C and 3C, the dimensional change affects the flow rate characteristic of the solenoid valve 1. As illustrated in FIG. 3C, in the rubber member 108 of the reference example, a dimensional change direction B of the valve seat abutting portion 108a is the same as a direction affecting the characteristic. In the reference example, when a thickness of the valve seat abutting portion 108a in the opening and closing direction is decreased from that illustrated in order to suppress the change in characteristic, the effect of suppressing the operation sound decreases. As just described, the rubber member 108 of the reference example cannot simultaneously achieve both the effect of suppressing the operation sound and an effect of suppressing the change in characteristic. On the other hand, as illustrated in FIG. 2C, in the rubber member 8 of the first embodiment, a dimensional change direction A of the valve seat abutting portion 8a is different from the direction affecting the characteristic, and thus the dimensional change in the direction affecting the characteristic is smaller than that of the reference example. Therefore, it is possible to achieve sufficient effect of suppressing the operation sound by sufficiently securing deformation in a direction for absorbing the impact while suppressing the change in characteristic of the solenoid valve 1 by suppressing the dimensional change due to environmental change and swelling.

Also, in the first embodiment, by providing the concave portion 8c on the side surface of the valve seat abutting portion 8a, the dimensional change amount of the valve seat abutting portion 8a in the direction affecting the flow rate characteristic of the solenoid valve 1 can be further decreased, and the deflection amount when the valve seat abutting portion 8a collides with the valve seat 6 can be further increased. Therefore, the effect of suppressing the change in characteristic and the effect of suppressing the operation sound of the solenoid valve 1 are improved.

Meanwhile, although the concave portion 8c of the illustrated example has the semicircular cross section, this may have any cross-sectional shape. Although the concave portion 8c of the illustrated example is provided over the entire circumference of the side surface of the valve seat abutting portion 8a, this may also be provided intermittently. However, when the concave portion 8c has a corner, stress concentrates there and a crack is likely to occur. Thus, this preferably has a shape which does not cause concentration of the stress, such as a semicircular cross section.

A method of manufacturing the solenoid valve 1 according to the first embodiment is next described. FIG. 4 is a cross-sectional view illustrating an example of a mold for illustrating the method of manufacturing the solenoid valve 1. The mold mainly includes a first mold 20 serving as a core and a second mold 21 serving as a cavity. A space 22 having a shape corresponding to the plunger 5 and a space 23 having a shape corresponding to the rubber member 8 are formed between the first mold 20 and the second mold 21. Also, in the space 23 of the second mold 21, an undercut portion having a shape corresponding to the concave portion 8c of the rubber member 8 is formed.

After the plunger 5 is manufactured from metal magnetic material, a part of a surface of the plunger 5 is processed to be rough to form a rough surface 5b, and an adhesive 5c is applied to the rough surface 5b. The rough surface 5b is formed at least in a portion which is brought into contact with the valve seat abutting portion 8a of the plunger 5, but in addition to this, the rough surface 5b may also be formed in a portion which is brought into contact with the pin abutting portion 8b. Although the adhesive 5c is applied to the rough surface 5b formed in the portion which is brought into contact with the valve seat abutting portion 8a of the plunger 5, in a case in which the rough surface is also formed in the portion which is brought into contact with the pin abutting portion 8b, this may also be applied to the rough surface. Thereafter, the plunger 5 is installed in the space 22, and liquid rubber is supplied to fill the space 23 as indicated by arrow C, thereby molding the valve seat abutting portion 8a, the pin abutting portion 8b, and the concave portion 8c of the rubber member 8. As a result, the rubber member 8 and the plunger 5 are put into a state bonded with the adhesive 5c, so that the rubber member 8 is less likely to deform. Thus, the effect of suppressing the change in characteristic is improved.

After molding the rubber member 8, the second mold 21 is opened in a direction of arrow D, the same direction as the reciprocating direction of the plunger 5, and an integrally molded product of the plunger 5 and the rubber member 8 is taken out. Since the first mold 20 and the second mold 21 have a structure to be opened in the direction of arrow D, the structure of the mold is simple and high productivity is achieved.

Meanwhile, although the second mold 21 includes the undercut portion for molding the concave portion 8c of the rubber member 8, elastic deformation of the concave portion 8c enables performing forced extraction of the second mold 21 in the direction of arrow D. Therefore, even in a case in which the concave portion 8c is provided on the side surface of the rubber member 8 by molding, a simple mold structure in which the first mold 20 and the second mold 21 are opened in the direction of arrow D may be used as in the description above. Therefore, it is possible to mold the concave portion 8c without affecting the productivity.

As described above, the solenoid valve 1 according to the first embodiment is provided with the solenoid unit 2 which generates the electromagnetic attracting force, the spring 3 which generates the biasing force in the direction opposite to that of the electromagnetic attracting force, the plunger 5 which reciprocates in the directions of opening and closing the fluid passage 4 by the electromagnetic attracting force and the biasing force, the valve seat 6 provided in the fluid passage 4, the pin 7 which restricts the movement of the plunger 5 caused by the electromagnetic attracting force, the rubber member 8 provided on the surface of the plunger 5 facing the valve seat 6 and on the surface of the plunger 5 facing the pin 7 to abut on the valve seat 6 and the pin 7 along with the reciprocating movement of the plunger 5, and the mountain-shaped mountain portion 5a protruded from the surface of the plunger 5 facing the valve seat 6 to the inside of the rubber member 8. With this configuration, the dimensional change of the valve seat abutting portion 8a in the opening and closing direction is small, so that the change in characteristic can be suppressed. Also, it is possible to secure the deflection amount of the rubber member 8 sufficient for absorbing the impact when the valve seat abutting portion 8a collides with the valve seat 6, thereby suppressing the operation sound.

Also, according to the first embodiment, in a case in which the concave portion 8c is formed on the side surface of the valve seat abutting portion 8a, the effect of suppressing the change in characteristic and the effect of suppressing the operation sound are further improved.

Also, according to the first embodiment, in a case in which the cross-sectional shape of the concave portion 8c is the semicircular shape, the stress concentration on the concave portion 8c is eliminated, and thus durability is improved.

Also, in the method of manufacturing the solenoid valve 1 according to the first embodiment, after the adhesive 5c is applied to the mountain portion 5a provided on the plunger 5, the rubber member 8 is integrally molded with the plunger 5. As a result, it is possible to manufacture the solenoid valve 1 achieving the effect of suppressing the operation sound and the effect of suppressing the change in characteristic. Also, the plunger 5 and the rubber member 8 are firmly fixed with the adhesive 5c, so that the rubber member 8 is less likely to deform. Thus, the effect of suppressing the change in characteristic is improved.

Also, according to the first embodiment, in a case of providing the concave portion 8c on the side surface of the rubber member 8, it is possible to mold the concave portion 8c on the side surface of the rubber member 8 by the first mold 20 and the second mold 21 which are opened in the direction of arrow D, the same direction as the reciprocating direction of the plunger 5, and perform the forced extraction, so that the mold structure is simple.

Meanwhile, in the first embodiment, in order to simultaneously mold the valve seat abutting portion 8a and the pin abutting portion 8b by single rubber filling when molding, a hole is formed on the mountain portion 5a of the plunger 5 to serve as a filling path; however, depending on the method of manufacturing the valve seat abutting portion 8a and the pin abutting portion 8b, the hole of the mountain portion 5a may be eliminated. However, as compared with a configuration in which the valve seat abutting portion 8a and the pin abutting portion 8b are individually fixed to the plunger 5, a configuration in which the valve seat abutting portion 8a and the pin abutting portion 8b are connected through the hole of the mountain portion 5a makes it difficult for the rubber member 8 to fall away from the plunger 5, and thus durability thereof is high.

Second Embodiment

In the first embodiment, the configuration for suppressing the operation sound when the rubber member 8 collides with the valve seat 6 is mainly described. In a second embodiment, a configuration for suppressing an operation sound when a rubber member 8 collides with a pin 7 is described.

In the second embodiment, the pin 7 is made of resin. Generally, the pin 7 is made of metal, but when this is made of resin, impact when a pin abutting portion 8b of the rubber member 8 collides with the pin 7 is attenuated, and thus the operation sound is suppressed. Resin material forming the pin 7 is, for example, polyphenylene sulfide (PPS) or nylon and may be selected depending on a usage environment of a solenoid valve 1. Meanwhile, since a configuration of the solenoid valve 1 of the second embodiment is the same as that of the solenoid valve 1 illustrated in FIG. 1 except that the pin 7 is made of resin, illustration and description thereof are omitted.

Also, a shape of the pin 7 or the rubber member 8 may be altered as follows.

FIGS. 5A to 5D are cross-sectional views illustrating configuration examples of the pin 7 and the rubber member 8 in the solenoid valve 1 according to the second embodiment of the present invention. Since the configuration of the solenoid valve 1 except for the pin 7 and the rubber member 8 in FIGS. 5A to 5D is the same as that of the solenoid valve 1 illustrated in FIG. 1, illustration and description thereof are omitted. As illustrated in FIGS. 5A to 5D, in the second embodiment, at least one of a surface of the pin 7 which abuts on the rubber member 8 and a surface of the rubber member 8 which abuts on the pin 7 is formed into a convex shape 30 or a concave shape 31.

Figure 5A:
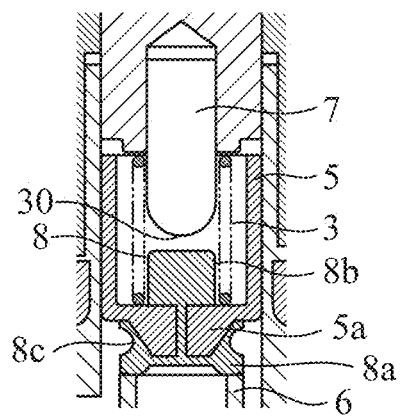
FIGS. 5A to 5D are cross-sectional views illustrating configuration examples of a rubber member and a pin in a solenoid valve according to a second embodiment of the present invention.
Figure 5B:
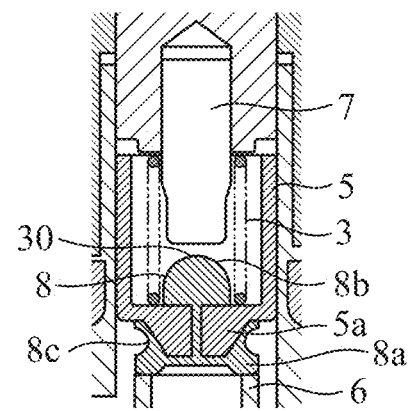
Figure 5C:
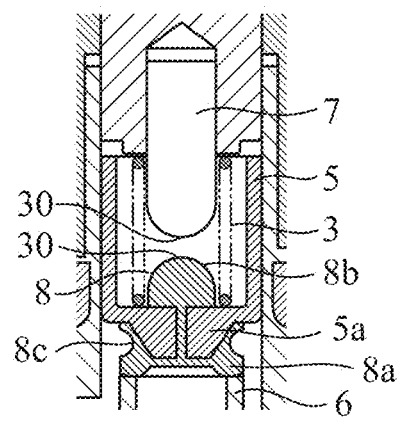

In an example in FIG. 5A, the convex shape 30 is formed on the surface of the pin 7 which abuts on the rubber member 8. In an example in FIG. 5B, the convex shape 30 is formed on the surface of the rubber member 8 which abuts on the pin 7. In an example in FIG. 5C, the convex shape 30 is formed on the surface of the pin 7 which abuts on the rubber member 8, and the convex shape 30 is also formed on the surface of the rubber member 8 which abuts on the pin 7. Since the convex shape 30 is formed on the pin 7 or the rubber member 8, when the pin abutting portion 8b collides with the pin 7, deformation is easily achieved. Thus, an effect of suppressing the operation sound is improved.

Figure 5D:
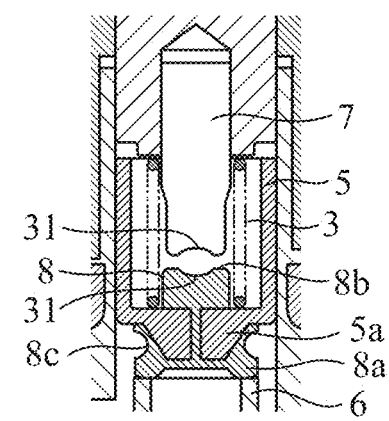

In an example in FIG. 5D, the concave shape 31 is formed on the surface of the pin 7 which abuts on the rubber member 8, and the concave shape 31 is also formed on the surface of the rubber member 8 which abuts on the pin 7. Although not illustrated, it is also possible that the concave shape 31 is formed only on the surface of the pin 7 which abuts on the rubber member 8, and on the contrary, the concave shape 31 is formed only on the surface of the rubber member 8 which abuts on the pin 7. Since the concave shape 31 is formed on the pin 7 or the rubber member 8, when the pin abutting portion 8b collides with the pin 7, deformation is easily achieved. Thus, the effect of suppressing the operation sound is improved.

Also, a concave portion 8d may be provided on a side surface of the pin abutting portion 8b.

Figure 6:
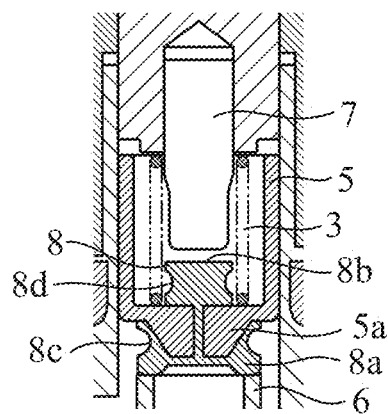
FIG. 6 is a cross-sectional view illustrating a configuration example of the rubber member and the pin in the solenoid valve according to the second embodiment.

FIG. 6 is a cross-sectional view illustrating a configuration example of the pin 7 and the rubber member 8 in the second embodiment of the present invention. Since the configuration of the solenoid valve 1 except for the pin 7 and the rubber member 8 in FIG. 6 is the same as that of the solenoid valve 1 illustrated in FIG. 1, illustration and description thereof are omitted. As illustrated in FIG. 6, in the second embodiment, the concave portion 8d is formed on the side surface of the pin abutting portion 8b. Since the concave portion 8d is formed, when the pin abutting portion 8b collides with the pin 7, deformation is easily achieved. Thus, the effect of suppressing the operation sound is improved.

Although the concave portion 8d of the illustrated example has a semicircular cross section, this may have any cross-sectional shape. Although the concave portion 8d of the illustrated example is provided over an entire circumference of the side surface of the pin abutting portion 8b, this may also be provided intermittently. However, when the concave portion 8d has a corner, stress concentrates there and a crack is likely to occur. Thus, this preferably has a shape which does not cause concentration of the stress, such as a semicircular cross section.

Also, it is possible to mold the concave portion 8d by forming an undercut portion in the space 23 of the first mold 20 illustrated in FIG. 4, and it is also possible to perform forced extraction.

Meanwhile, in the second embodiment, in a case in which the pin 7 is made of resin, the convex shape 30 or the concave shape 31 is formed on the pin 7 or the rubber member 8, or the concave portion 8d is formed on the side surface of the pin abutting portion 8b, the effect of suppressing the operation sound is improved as compared with that of the configuration of the first embodiment. Thus, it is possible to decrease a thickness of the pin abutting portion 8b in an opening and closing direction by an improved effect. By decreasing the thickness of the pin abutting portion 8b, it is possible to improve an effect of suppressing change in characteristic while maintaining the effect of suppressing the operation sound equivalent to that of the first embodiment.

Meanwhile, in the present invention, embodiments may be freely combined, any component in each embodiment may be modified, or any component in each embodiment may be omitted without departing from the scope of the invention.

INDUSTRIAL APPLICABILITY

Since the solenoid valve according to the present invention suppresses the operation sound while suppressing the change in characteristic of the solenoid valve due to the effect of the usage environment, the solenoid valve is suitable for use as a solenoid valve used in a place where environment change is large and the operation sound is easily heard by a user, such as a vehicle.

REFERENCE SIGNS LIST

1: Solenoid valve, 2: Solenoid unit, 2a: Coil, 2b: Core, 3: Spring, 4: Fluid passage, 5, 105: Plunger, 5a: Mountain portion, 5b: Rough surface, 5c: Adhesive, 6: Valve seat, 7: Pin, 8, 108: Rubber member, 8a, 108a: Valve seat abutting portion, 8b, 108b: Pin abutting portion, 8c, 8d: Concave portion, 9, 10: Port, 20: First mold, 21: Second mold, 22, 23: Space, 30: Convex shape, 31: Concave shape

The invention claimed is:

1. A solenoid valve comprising:
a solenoid unit for generating electromagnetic attracting force;
a spring for generating biasing force in a direction opposite to a direction of the electromagnetic attracting force;
a plunger for reciprocating in directions of opening and closing a fluid passage by the electromagnetic attracting force and the biasing force;
a valve seat provided in the fluid passage;
a pin for restricting movement of the plunger caused by the electromagnetic attracting force;
a rubber member provided on a surface of the plunger facing the valve seat and on a surface of the plunger facing the pin and for abutting on the valve seat and the pin along with reciprocating movement of the plunger; and
a mountain-shaped mountain portion protruded from the surface of the plunger facing the valve seat to an inside of the rubber member, wherein
the rubber member includes a concave portion on a side surface, the concave portion being an open cavity.

2. The solenoid valve according to claim 1, wherein the concave portion has a semicircular cross section.

3. The solenoid valve according to claim 1, wherein the pin is made of resin.

4. The solenoid valve according to claim 1, wherein at least one of a surface of the pin which abuts on the rubber member and a surface of the rubber member which abuts on the pin has a convex shape or a concave shape.

5. The solenoid valve according to claim 1, wherein the solenoid valve controls a flow rate of evaporation gas flowing from a canister to an engine of a vehicle.

6. A method of manufacturing a solenoid valve, the solenoid valve including:
a solenoid unit for generating electromagnetic attracting force;
a spring for generating biasing force in a direction opposite to a direction of the electromagnetic attracting force;
a plunger for reciprocating in directions of opening and closing a fluid passage by the electromagnetic attracting force and the biasing force;
a valve seat provided in the fluid passage;
a pin for restricting movement of the plunger caused by the electromagnetic attracting force;
a rubber member provided on a surface of the plunger facing the valve seat and on a surface of the plunger facing the pin and for abutting on the valve seat and the pin along with reciprocating movement of the plunger; and
a mountain-shaped mountain portion protruded from the surface of the plunger facing the valve seat to an inside of the rubber member,
the method comprising:
molding the rubber member integrally with the plunger after applying an adhesive to the mountain portion provided on the plunger, the rubber member including a concave portion on a side surface,
wherein the concave portion remains an open cavity after assembling the solenoid valve.

7. The method of manufacturing the solenoid valve according to claim 6, wherein the concave portion is molded on the side surface of the rubber member by a mold which opens in a same direction as a reciprocating direction of the plunger and forced extraction is performed.

* * * * *